United States Patent Office 3,522,573
Patented Aug. 4, 1970

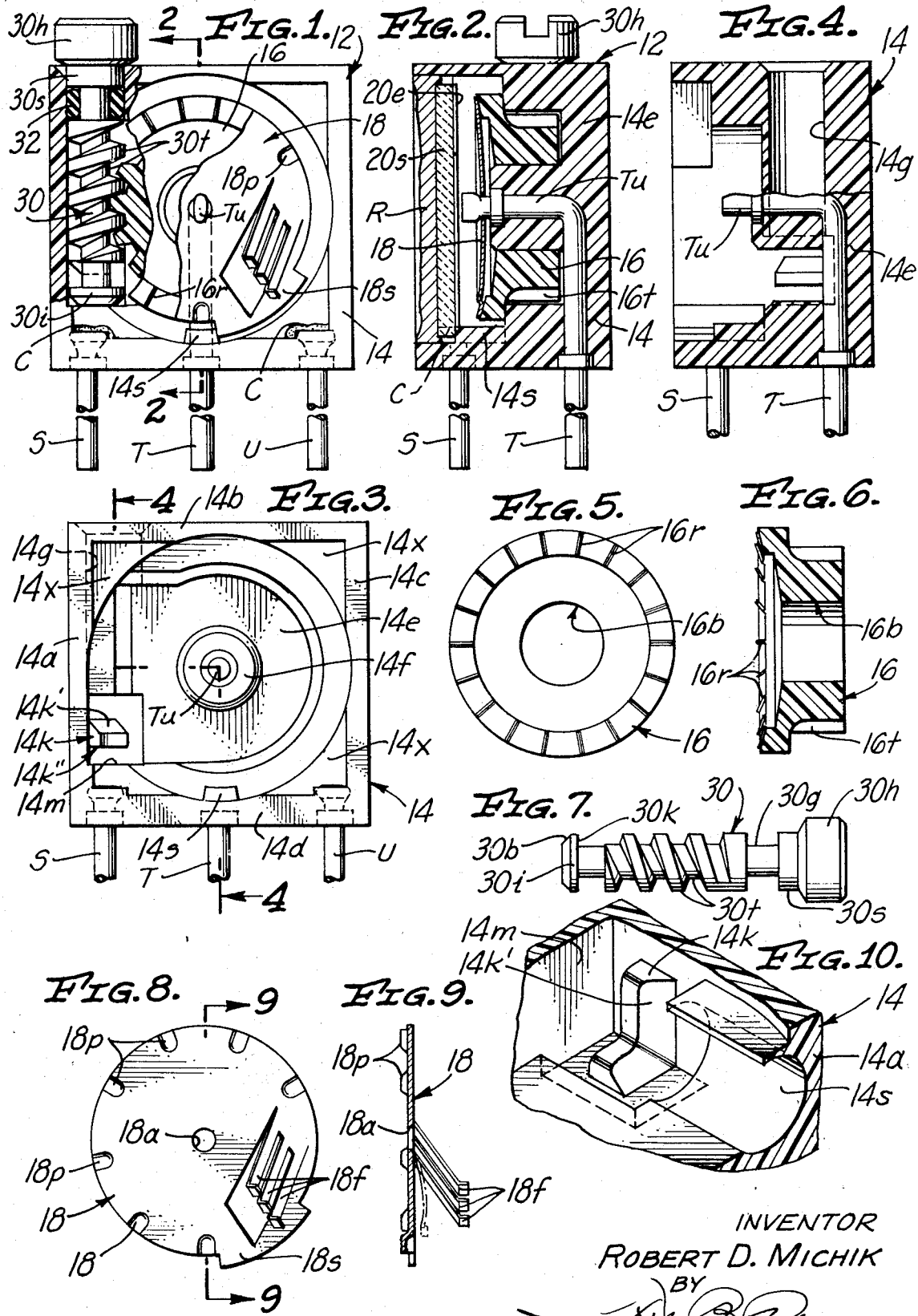

3,522,573
POTENTIOMETER SHAFT RETENTION
Robert D. Michik, Riverside, Calif., assignor to Bourns, Inc., Riverside, Calif.
Filed Jan. 10, 1969, Ser. No. 790,344
Int. Cl. H01c 9/02
U.S. Cl. 338—171                2 Claims

ABSTRACT OF THE DISCLOSURE

Improvement in shaft-adjusted potentiometers or variable resistors of the type wherein a wormshaft or screw or a leadscrew is rotated to accomplish traverse of a movable contact over an extent of a resistance element to change the electrical resistance exhibited by the instrument, the improvement resting in a unique form of screw member and cooperating components permitting the screw to be simply axially moved or pressed into and through an aperture in the housing whereby a head on the inner end of the shaft cams itself around and behind an abutment where it is held and which abutment prevents reverse axial movement, whereby necessity for a retaining pin, clip or like member is obviated and tedious and costly assembly steps are eliminated.

CROSS-REFERENCE TO RELATED APPLICATION

Certain novel features of the exemplary variable resistor (potentiometer) herein illustrated form the subject matter of the co-pending application of Robert D. Michik, Wilbur T. Hardison and Robert N. Sporrong, Ser. No. 790,335, filed Jan. 10, 1969.

BACKGROUND OF THE INVENTION

Screw-adjusted variable resistors such as potentiometers of the classes commonly denominated leadscrew-adjusted potentiometers and worm gear adjusted potentiometers employ actuating mechanism comprising a leadscrew or worm screw (hereinafter abbreviated to the word screw, in the interest of brevity) for adjusting the position of a wiper or movable contact for adjusting the resistance exhibited between two terminals. The screw has a head or actuating end that is accessible from the exterior of the potentiometer housing or case so adjustments may be made by rotating the screw. The opposite or "interior" end of the screw is journaled in journal means inside the case or housing. To preclude entry of undesirable foreign material into the interior of the housing the latter is sealed, an O-ring or like seal being provided around the shank of the screw for that purpose. In general, it has been the prior-art practice to mount the screw manually prior to assembly of the two portions (cover and base) of the housing, by pressing the screw axially through an opening in the housing while guiding the inner end of the screw into the journal in the interior, and then a pin or clip retainer is inserted into engagement with the screw to hold it in place. Thereafter assembly of the housing is completed.

SUMMARY OF THE INVENTION

In the present invention the necessity for a retainer pin or clips, and the manual assembly operations incident thereto, are obviated and other advantages gained by so constructing the housing and screw that the screw is automatically locked in position and prevented from outward movement as soon as it is installed by a simple application of axial force. The screw is formed with an inner end of special shape including an annular shoulder and an annular cam face, which end is for convenience only herein termed as inner head. The housing is formed with an inwardly-extending formation, herein termed an abutment for convenience, which abutment comprises a cam surface for cooperation with the annular cam face of the screw and further comprises a ledge or stop which cooperates with the annular shoulder on the inner head of the screw. The formations are such that as the screw is inserted axially through the opening in the housing, the annular cam face of the screw comes into contact with the cam surface of the housing abutment. Further inward translation of the screw causes the cam surface to guide and deflect the inner head of the screw away from the normal line of position of the screw until further inward translation permits the inner head to pass the ledge and to snap into a position in which the screw is in normal position and the annular shoulder of the screw is engaged against the ledge or stop. During the insertion of the screw the O-ring seal member, which has previously been installed in an annular recess near the outer head of the screw, enters the bore of the aperture through which the screw is being pressed, and thus seals the aperture. The inner end of the screw comes into contact with, or in very close adjacency to, a wall or the interior of the housing at the time the inner head of the screw moves behind the abutment. Thus the screw comes into a position in which it may be rotated about its axis but from which it cannot move axially in either direction. Subsequent installation of other operating parts of the potentiometer, for example a gear wheel in the illustrated potentiometer or a slider in a leadscrew potentiometer, prevents lateral shift of the screw from the operating position described.

BRIEF DESCRIPTION OF THE DRAWINGS

The invention is illustrated in a presently preferred embodiment, in a wormscrew adjusted potentiometer, in the accompanying drawings, in which:

FIG. 1 is a plan view of an exemplary potentiometer incorporating the invention in a presently preferred form, with portions of components broken away to reveal internal details, the instrument being shown to grossly enlarged but arbitrary scale;

FIG. 2 is a sectional view of the exemplary potentiometer, the section being as indicated by indicators 2—2 in FIG. 1;

FIG. 3 is a plan view of the principal housing member of the potentiometer depicted in FIG. 1, with appurtenant terminals;

FIG. 4 is an offset sectional view of part of the structures depicted in FIG. 3, the sectioning being as indicated by indicators 4—4 in FIG. 3;

FIG. 5 is a plan view, and FIG. 6 is a transverse sectional view, of a rotatable member comprised in the operating mechanism of the potentiometer depicted in FIG. 1;

FIG. 7 is a plan view of the screw device comprised in the exemplary potentiometer and incorporating features of the invention;

FIG. 8 is a plan view of a second rotatable member comprised in the operating mechanism of the exemplary potentiometer and comprising contact means;

FIG. 9 is a sectional view of the member depicted in FIG. 8, the sectioning being as indicated by indicators 9—9 in FIG. 8; and FIG. 10 is a fragmentary pictorial view showing details at an interior corner region in the principal housing member depicted in FIG. 3.

DESCRIPTION OF THE PREFERRED EMBODIMENT

In the drawings, the exemplary screw-shaft adjusted variable resistor or potentiometer is denoted generally by the number 12, and is herein chosen as a wormscrew-adjusted potentiometer for convenience in illustrating the invention. The potentiometer comprises a housing member of open-top box-like form, herein termed a box, denoted by number 14, in which box are housed the operating mechanism by means of which resistance adjustments are effected. Incorporated in the housing, as by being insert-molded into appropriate portions of box 14, are three pin terminal members S, T and U (FIGS. 1 and 3) by means of which external electrical connections to the active electrical components may be accomplished.

Referring to FIGS. 2 and 3, the box is formed, as by injection molding of insulative synthetic polymer, with four outer wall portions 14a, 14b, 14c and 14d, a floor or bottom 14e and an upstanding central hub 14f in which is embedded an upstanding inner end portion Tu of terminal member T. Wall 14b is bored or formed with a bore 14g (FIGS. 3 and 4) for reception of screw means presently to be described, and the bore extends as a partial bore or seat 14s (FIG. 10) along wall 14a. From floor 14e and wall 14a there extends inwardly into the box an integral cam-faced abutment 14k (FIG. 10) of angular or L-shaped configuration, the inclined surface of which next-adjacent seat 14s provides a cam face 14k'. Thus the box provides a generally annular lower cavity encircling hub 14f and a generally circular upper cavity above the hub and into which cavity the abutment 14k protrudes, and which upper cavity communicates with bore 14g. The cavity walls and floor are shaped to cooperate with and accommodate the rotary components presently to be described.

Disposed for rotation on the hub 14f at the lower cavity of the box in a wheel 16 (FIGS. 2, 5 and 6). The lower portion of the wheel is formed as a gear with teeth such as 16t and with a bore 16b for rotational bearing on the hub. The upper portion of the wheel is extended radially outwardly and is provided with a series of formations which may be radial ridges 16r as shown, or depressions, and which portion of increased diameter serves as one element of a friction clutch.

With reference to FIGS. 1 and 2, there is disposed for rotation on the upwardly protruding end Tu of terminal member T, a disc-like contact plate 18 (see FIGS. 8 and 9). The contact plate has an aperture 18a for close fit on and adjacent the end portion of terminal T, and has a series of protuberances 18p formed along a part of the periphery on the lower face thereof. The protuberances are formed by depressing portions of the plate by die means, and are dimensioned and spatially arranged to fit between, and cooperate with, the formations 16r on wheel 16. The contact plate 18 carries contact means which in this preferred example comprises a set of resilient contact fingers 18f formed integral with the body of the plate by punch-forming operations. The outer end of each finger is formed into a contact adapted to brush on an element presently to be described. The contact plate is made of resilient conductive material. It is maintained under stress with its perhiphery pressing downwardly into frictional engagement with the complementary annular upper outer surface of wheel 16 by a deformed (flattened) upper end of terminal T, as indicated in FIG. 2. An upper portion of the wire of which terminal T is made is severed and the end is flattened after plate 18 has been fitted on the wire, and while the plate is forced downwardly as indicated. Thereby the plate is maintained in good electrical contact with terminal member T, and in frictional clutching engagement with wheel 16. Thus the contact plate is adapted to be yieldingly but rather positively rotated by the wheel 16 in either direction of rotation, utnil a radial stop-extension 18s (FIG. 8), formed at the periphery of the plate, is driven into engagement with a stop 14s (FIGS. 1, 2 and 3). The stop 14s is preferably formed as an inwardly extending protuberance from wall 14d of the housing box. Thereafter continued rotation of the wheel 16 in the same direction merely causes slippage of the wheel relative to the arrested contact plate. The stop-extension 18s of the plate is illustrated in FIG. 1 in arresting contact with stop 14s of the box.

The contact means of the plate 18 are shaped and dimensioned to extend upwardly from the body of the plate into resilient brushing contact with an arcuate resistance element 20e shown in section in FIG. 2. The resistance element is of the applied-film type, such as a cermet element, produced on a square wafer-like substrate 20s in a well-known manner. The substrate fits in the top of the housing box, and serves, inter alia, as a cover member of the box-like housing. At its corner regions the substrate 20s rests on ledges such as those denoted 14x in FIG. 3, and when thus disposed, positions the element 20e in depressing relationship with the contact fingers 18f. The arcuate resistance element is provided with conductive ends which are adapted to electrically connect with respective ones of terminal members S and U via patches of conductive cement C, C (FIG. 1) which are applied just prior to application of the substrate to the box. As indicated in FIG. 2, the cement C contacts upturned swaged ends of the terminal members, and the conductive ends of the resistance element. The force exerted by the stressed contact means 18f tends to raise the cover or substrate; and hence the latter is held in place, and the housing is sealed, by adhesive potting compound, R (FIG. 2), which is applied around the exterior periphery of the substrate and cured while the substrate is held in place.

Prior to assembly of wheel 16 on hub 14f, a double-headed actuating member or screw, 30 (FIGS. 1 and 7), is inserted into the aforementioned bore 14g in the box 14 into the position indicated in FIG. 1. The screw 30 has a driving head 30h accessible outside the housing for rotation by an instrumentality such as a screwdriver, and a shank 30s which is annularly grooved at 30g to accommodate an O-ring seal member 32 (FIG. 1). The middle portion of screw 30 is threaded to provide a thread 30t complementary to and cooperable with the gear portion of wheel 16 to rotate the latter. In accord with one feature of the invention, screw 30 has a second or inner head, 30i, the end face of which is beveled at 30b. The inner head provides an annular shoulder 30k which is spaced away from the near end of the thread 30t as indicated in FIG. 7. Thus with the screw formed as indicated and bearing the O-ring seal 32, the screw is installed by insertion of the inner head axially into bore 14g until the bevel at 30b on the inner head strikes the inclined curved cam surface 14k' on housing abutment 14k. Further inward forced movement of the screw causes slight deformation of components as the inner head is cammed away from the axis of the bore, and the head 30i thereafter snaps back into coaxial relationship with the bore and with shoulder 30k engaged with the complementary face 14k" of the abutment 14k as indicated in FIG. 1. Concurrently the end face of the screw comes into contact with the interior wall of the box at the region denoted 14m in FIGS. 3 and 10. Thus the screw is restrained by the surface at 14m from further inward translation, and by engagement of shoulder 30k with surface 14k" of the abutment from outward translation. Thus the screw is retained in position and prevented from axial translation, without use of a retainer clip or pin, and assembly is greatly expedited while at the same time the total number of parts required by the prior art screw-actuated resistors is reduced.

Following the simple installation of the screw 30 as detailed in the preceding paragraph, wheel 16 is placed on hub 14f. As is evident, wheel 16 thereafter prevents any possible movement of screw 30 away from coaxial alignment with bore 14g; and thus the screw becomes positively restrained from any undesired motion. Application of contact plate 18 over the wheel with downward stress, and flattening or deformation of the upper end Tu of terminal T, as indicated in FIGS. 1 and 2, insures that the wheel is retained in place. Certain features of the terminal arrangement and construction, and of the contact arrangement, whereby simplification and reduction of parts and costs of manufacture are attained, are subjects of claims in the previously noted co-pending application. The preceding description of an exemplary embodiment of the invention shows complete attainment of the objects of the invention.

I claim:
1. A screw-adjusted potentiometer comprising:
first means, including housing means which comprise a housing member having a bore therein for reception of a rotary screw therein;
second means, including a rotary screw having inner and outer heads at opposite ends thereof and a threaded intermediate portion;
third means, including elongate resistor means and contact means arranged for brushing contact with the resistor means;
fourth means, including means engaged with the threaded portion of said screw and with said contact means to move the latter in response to rotation of said screw;
said housing member having an abutment projecting into the path of entry of said inner head of said screw into said housing means and effective to deflect and cam said screw out of coaxial alignment with said bore during insertion of said screw into said housing whereby said inner head of said screw is forced out of coaxial alignment and springs into coaxial alignment with said bore and becomes seated against said abutment as said screw is entered into said bore and housing means,
whereby said screw is permitted to be installed in said housing and bore by simple inward translation and is thereafter restrained from outward translation by engagement of said inner head by said abutment.

2. A screw-adjusted potentiometer as defined in claim 1, in which said means engaged with the threaded portion of said screw is a wheel and is effective to restrain said screw from lateral movement out of coaxial relationship with said bore.

References Cited

UNITED STATES PATENTS 3,242,451    3/1966    Mathison.
3,399,367    8/1968    Tumbusch.

LARAMIE E. ASKIN, Primary Examiner

D. A. TONE, Assistant Examiner

U.S. Cl. X.R.
338—162